T. F. BUTZEN & M. W. KINGSLEY.
ELECTRIC WORK LIGHT.
APPLICATION FILED MAR. 25, 1914.
1,129,846.
Patented Mar. 2, 1915.
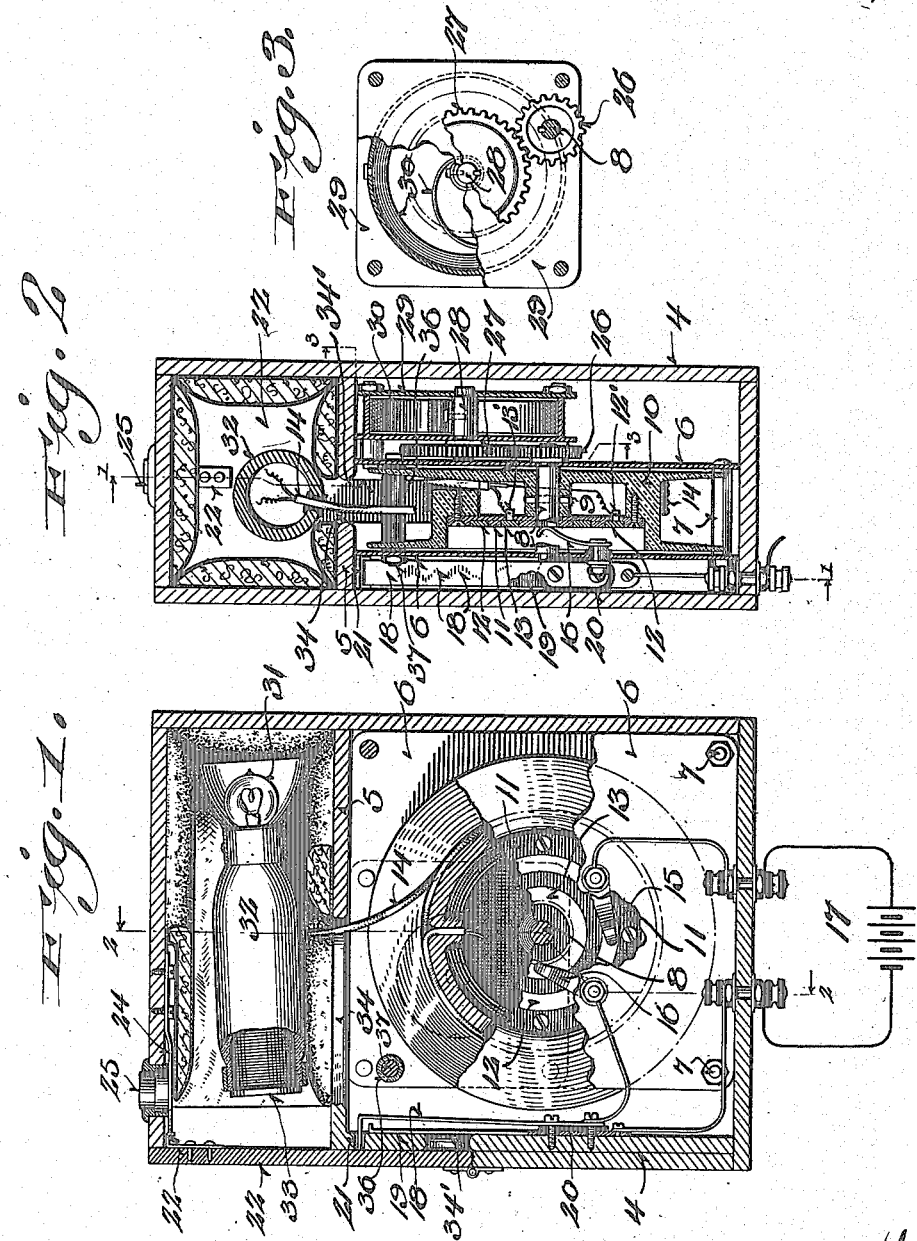

UNITED STATES PATENT OFFICE.

THOMAS F. BUTZEN AND MICHAEL W. KINGSLEY, OF MILWAUKEE, WISCONSIN.

ELECTRIC WORK-LIGHT.

1,129,846.  Specification of Letters Patent.  Patented Mar. 2, 1915.

Application filed March 25, 1914. Serial No. 827,203.

*To all whom it may concern:*

Be it known that we, THOMAS F. BUTZEN and MICHAEL W. KINGSLEY, both citizens of the United States, and residents of Milwaukee, in the county of Milwaukee and State of Wisconsin, have invented certain new and useful Improvements in Electric Work-Lights; and we do hereby declare that the following is a full, clear, and exact description thereof.

Our invention consists in what is herein particularly set forth with reference to the accompanying drawings and pointed out in the claims of this specification, its object being to provide incandescent electric-lamp work-lights each cord supported in connection with a self-winding reel. The invention also extends to a reel casing having a preferably upholstered compartment in which to stow the lamp when out of use, there being make and break control of the lamp-circuit by a closure of said compartment.

Our illuminating apparatus is especially designed, in connection with a battery, as a motor vehicle accessory, but it may be utilized, in conjunction with any suitable source of electricity, to facilitate examination of stationary machinery near which it may be placed.

Figure 1 of the drawings is indicated by line 1—1 in Fig. 2, and represents a sectional view of a compartment casing containing a self-winding reel and a cord supported incandescent electric-lamp work-light in connection with the reel, the lamp-circuit being broken; Fig. 2, a cross-section indicated by line 2—2 in Fig. 1, and Fig. 3, a partly sectional elevation of a spring-motor for said reel, the view being indicated by line 3—3 in Fig. 2.

Referring by numerals to the drawings, 4 indicates a casing divided by a horizontal partition 5 into compartments. In the lower compartment is a frame comprising a pair of parallel plates 6 connected by bolts 7. Journaled in said plates is an arbor 8, and fast on the arbor, by a pin 9 or otherwise, is the hub of a reel 10, this reel being preferably a one piece countersunk device having its recess of least diameter covered by a disk 11 of suitable insulating material, and set in the disk are concentric contact rings 12, 13. The insulating disk is held in place by screws or other suitable means, and extending through the winding portion of the reel into the space back of said disk is a two wire current conductor cord 14. One wire of the cord is connected to an inwardly extending lug 12' of the ring 12, and the other wire of said cord is connected to a similar lug 13' of the ring 13, these connections being clearly shown in Fig. 2.

In suitable insulated connection with the forward plate of the reel-frame are spring contact-blades 15, 16, in touch with the rings 12 and 13, respectively. The blade 15 is wired in connection with a pole of a battery 17 or other source of electric current supply, and the other blade 16 is likewise connected to a spring-blade member 18 of an electric-switch herein shown attached to a wall of the aforesaid casing. A stationary blade member 19 of the switch is wired to the other pole of said source of electric current supply, insulation 20 being interposed between the connected ends of said switch members.

The free end of the switch-member 19 is flanged, in opposition to the other switch-member 18, which same has an end-flange extending through a play-slot 21 in the adjacent wall of the casing to oppose a hinged door 22 or other suitable movable closure for the upper compartment of said casing. If a hinged door, the closure is obviously self-opening. The door being closed, the switch is open as shown in Fig. 1, but said door being opened there is automatic closing of said switch. A keeper 23 with the door 22 is engageable with a spring-latch 24 fastened in the casing, and a push-button 25 is arranged in opposition to the latch.

Fast on a journal end of the arbor 8 is a spur-pinion 26 in mesh with a spur-wheel 27, that is fast on spindle 28 journaled in walls of a housing 29 suspended in connection with an adjacent wall of the aforesaid casing, and within the housing is a volute-spring 30 fastened at its ends to said spindle and housing, there being wind of the spring when the cord 14 is unwound from its reel. In suitable connection with the wires of said cord, to be in circuit with the aforesaid source of electricity and switch, is an incandescent lamp 31 insulated in a handle 32, that preferably contains a partly exposed electro-magnet 33 that is also put in circuit with said source of electricity and switch. The upper apartment of the aforesaid casing is for the lamp when not in use, and it may be upholstered, as herein shown, to absorb shocks that would be detrimental to said lamp.

The partition 5 in the casing is centrally recessed for approximately one-half of its width from the front where the recess 34 intersects a vertical recess 34' of a wall of the casing. The cord 15 is guided in said recesses, and it is preferable to employ a cord-supporting anti-friction roller 36 on a bolt 37 engaging the plates 6 of the reel-frame.

In practice opening of the upper compartment of the casing results in the closing of the electric-circuit through the lamp and electro-magnet with the handle 33, and use of said lamp entails an unwinding of the supporting cord from the reel. Tension on the cord being slackened, said cord is recovered on the self-winding reel and the lamp being returned to the compartment therefor in the casing, closing of said compartment serves to break said electric-circuit. The electro-magnet may be utilized in connection with an attractive surface to automatically suspend the lamp when current is on both.

We claim:

1. The combination of a self-winding reel and an insulating disk therewith, concentric contact-rings set in the disk, a stationary spring contact-blade in touch with each ring and connected to a source of electricity, a current conductor cord comprising wires in connection with said rings and which winds upon the reel, a cord-supported portable incandescent electric-lamp, and a switch in the electric-circuit.

2. The combination of a casing, a self-winding reel in a compartment of the casing, a current conductor cord in connection with the reel and with a source of electricity, a cord supported portable incandescent electric-lamp contained in another compartment of the casing when not in use, a switch in the electric-circuit, and a switch-controlling closure for the lamp-compartment of said casing.

3. The combination of a casing, a self-winding reel in a compartment of the casing, a current conductor cord in connection with the reel and with a source of electricity, a cord supported portable incandescent electric-lamp contained in another compartment of the casing when not in use, a switch in the electric-circuit, a self-opening switch-controlling door for the lamp-compartment of said casing, and means for latching the door in closed position.

4. The combination of a casing, a horizontal partition therein having a transverse recess that intersects at its front with a vertical recess in a wall of the casing, a self-winding reel in the casing below the partition, an incandescent electric-lamp contained in the space above said partition when not in use, a current-conductor lamp-supporting cord in connection with the reel and a switch-controlled source of electricity, the cord being guided in the aforesaid recess, and an anti-friction roller arranged to support said cord as the same unwinds from said reel.

5. The combination of a casing, a self-winding reel in a compartment of the casing, a current conductor cord in connection with the reel and with a source of electricity, a cord supported portable incandescent electric-lamp normally contained in another compartment of the casing, a movable closure for the lamp compartment, a switch in the electric circuit comprising a spring-contact opposing the compartment closure by which it is normally held out of working position, whereby opening of the lamp compartment results in closing of said circuit to energize said lamp.

In testimony that we claim the foregoing we have hereunto set our hands at Milwaukee in the county of Milwaukee and State of Wisconsin in the presence of two witnesses.

THOS. F. BUTZEN.
M. W. KINGSLEY.

Witnesses:
N. E. OLIPHANT,
M. E. DOWNEY.